United States Patent [19]
Sandlin

[11] 3,788,196
[45] Jan. 29, 1974

[54] LINEAR THRUSTER
[75] Inventor: William C. Sandlin, Waco, Tex.
[73] Assignee: Ultramation Inc., Waco, Tex.
[22] Filed: Aug. 9, 1971
[21] Appl. No.: 169,933

[52] U.S. Cl.......................... 92/13, 92/117, 92/161
[51] Int. Cl. ....................... F01b 15/00, F01b 29/00
[58] Field of Search .. 92/161, 161.5, 117, 118, 166, 92/146, 13, 13.8; 91/196, 411 B; 214/1 BB

[56] References Cited
UNITED STATES PATENTS

| | | | |
|---|---|---|---|
| 3,429,234 | 2/1969 | Taylor | 92/161 |
| 2,646,504 | 7/1953 | Gosline | 92/161 |
| 2,740,382 | 4/1956 | Morgan | 92/161 |
| 2,894,489 | 7/1959 | Clay | 92/161 |
| 2,933,068 | 4/1960 | Johnson et al. | 92/118 |
| 3,371,583 | 3/1968 | Blatt | 92/161 |

FOREIGN PATENTS OR APPLICATIONS
398,032  7/1924  Germany.......................... 91/411 B

*Primary Examiner*—Paul E. Maslousky
*Attorney, Agent, or Firm*—Harold J. Birch et al.

[57] ABSTRACT

A linear thruster comprising a housing supporting a power cylinder and piston, a thrust plate operated by said power cylinder and a pair of precision guide shafts slidably mounted in parallel bearings in the housing and attached to the thrust plate. The guide shafts insure that the thrust plate is moved very accurately in the desired direction. The guide shafts also resist torsional, lateral and tilting loads placed on the thrust plate. The cylinder is secured in an opening in the center of a rubberized fabric retainer. The retainer is then sandwiched between a mounting surface on the housing and a spring plate, each of which has an opening of radius slightly larger than the radius of the cylinder, through which the cylinder extends. The spring plate and retainer are fastened to the housing. The cylinder is thus attached to the retainer which in turn is attached to the housing. This allows the cylinder a slight amount of angular and axial movement, limited by the mounting plate and the housing, to provide compensation for inaccuracies in piston and cylinder manufacture, as well as lateral, torsional and shock loads.

21 Claims, 3 Drawing Figures

LINEAR THRUSTER

BACKGROUND OF THE INVENTION

There is a great demand for mechanisms capable of providing accurately guided movement to precisely position an object. Such mechanisms are commonly used in a variety of environments to perform a multitude of work functions such as the pick-up or placement of parts in assembly lines, the positioning of work pieces for operations such as punching, drilling, printing, stamping, embossing, clamping and so forth, and for positioning machine tools for manufacturing processes. In all of these jobs, the key requirement is repetitive precision movement in the face of undesired external loads and shocks, manufacturing inaccuracies, and wear on the positioning apparatus itself. Movement is usually accomplished by a power mechanism such as a piston/cylinder type expansible chamber motor acting on a thrust plate. Of course, it is advantageous to utilize conventional components whenever possible to reduce initial cost, maintenance and repair. Prior art machine designers have therefore used available power cylinders and have commonly custom designed linear thrusters for each machine application. Alone, the conventional piston and cylinder unit is incapable of withstanding other than minimal lateral loads during a power stroke without binding or damage to the piston rod, piston, cylinder walls, or seals, and offers no resistance to torsional loads tending to rotate the thrust plate. They are also damaged by shock loads, especially when an incompressible working fluid is used. The application of undesired external loads and shocks, and the inaccuracies in the manufacture and assembly of the piston and cylinder, manifest themselves in imprecise and unpredictable linear movement, both in direction and in length of stroke. Normal wear causes like problems. The same deficiencies are present in other types of power units, such as electric motors and solenoids. The reaction of the prior art has been to require a high degree of manufacturing excellence in the power unit components, increasing costs, or to add accessories to the power unit, thus increasing the complexity of the units with the attendant disadvantages. For example, power cylinders have been provided with mountings that allow compensation for the predicted unwanted outside effects. These consist of standard clevices, trunnion mounts and flexible rod-end connectors. Properly designed, these arrangements can protect the power cylinder from damage, but they invariably add length to the overall thrusting mechanism and are themselves subject to damage and wear. Furthermore, while these mechanisms provide some compensation for lateral or unbalanced linear forces that would tend to twist, bend or tilt the thrust plate, they provide no compensation for torsional loads. To correct this problem, unround cylinder rod configurations are commonly used. Such a rod cannot rotate and thus, when fixedly attached to the thrust plate, it resists rotation of the plate. However, the ability of an unround cylinder rod to resist rotation is quite limited since the resisting torque arm is quite short; it must be less than the radius of the cylinder. This type of arrangement usually allows an initial looseness of up to several degrees of rotation which increases rapidly with continued use, certainly an undesirable characteristic. Another means for resisting torsional forces consists of the attachment to the cylinder rod of external flanges, rods, or guide members. These arrangements also are not satisfactory.

SUMMARY OF THE INVENTION

This invention provides a novel linear thruster package that provides a precisely directed and controlled stroke in the face of lateral, torsional and tilting loads on the thrust plate and inaccuracies in power unit manufacture, and which protects the power unit from shock loads. It is a simple, compact unit that is easily installed. By virtue of its novel design, the inherent weakness of the power unit in the overall linear thruster structure is virtually eliminated as a design and operating factor.

The linear thruster set forth in this invention consists of a housing, a power unit, a thrust plate, a guide mechanism, and a power unit mounting. The housing is provided with a plurality of parallel bores into each of which is slidably mounted a guide rod. The guide rods are fixedly attached at one end to the thrust plate and precisely guide the thrust plate in its linear movement with respect to the housing. The thrust plate is attached to, or engages, the object to be moved. Motivating power for the unit is supplied by a power unit such as a hydraulic or pneumatic expansible chamber motor having a cylinder and a piston, although other types may be used. The features of the invention are most clearly described in regard to a piston/cylinder expansible chamber motor, and such a power unit will be used as a basis for explanation, although the invention is not limited to such a power unit. The power cylinder is mounted on the housing and the piston rod is connected to the thrust plate. The mounting for the cylinder in the housing is a key feature of the invention. It consists of a rubberized fabric retainer having a central opening equal to the diameter of the cylinder to which the cylinder is attached so that the retainer extends perpendicular to the cylinder axis. The retainer is captured between the housing and spring plate, with the cylinder extending through openings in the housing and spring plate. Each of the openings in the housing and the spring plate has a slightly greater radius than the radius of the cylinder. The difference between the cylinder radius and the radius of these openings is so small as not to allow the fabric to be pulled therethrough. This mounting arrangement allows the cylinder some degree of movement angularly and axially, thus allowing the cylinder to align itself to the piston for the length of the stroke, compensating for manufacturing inaccuracies and other external loads placed upon the piston or cylinder. The resilient mounting also absorbs shock loads that would otherwise be applied to the cylinder. The guide rods resist torsional, lateral and tilting loads placed upon the thrust plate and thus these loads are not communicated to the piston and cylinder. As a result of this, the power cylinder is used only to provide working power and not as a structural member and thus more lightly constructed unit can be used. The guide rods can also be equipped with devices such as collars to limit the linear movement thereof.

DESCRIPTION OF THE PREFERRED EMBODIMENT

Figure 1:
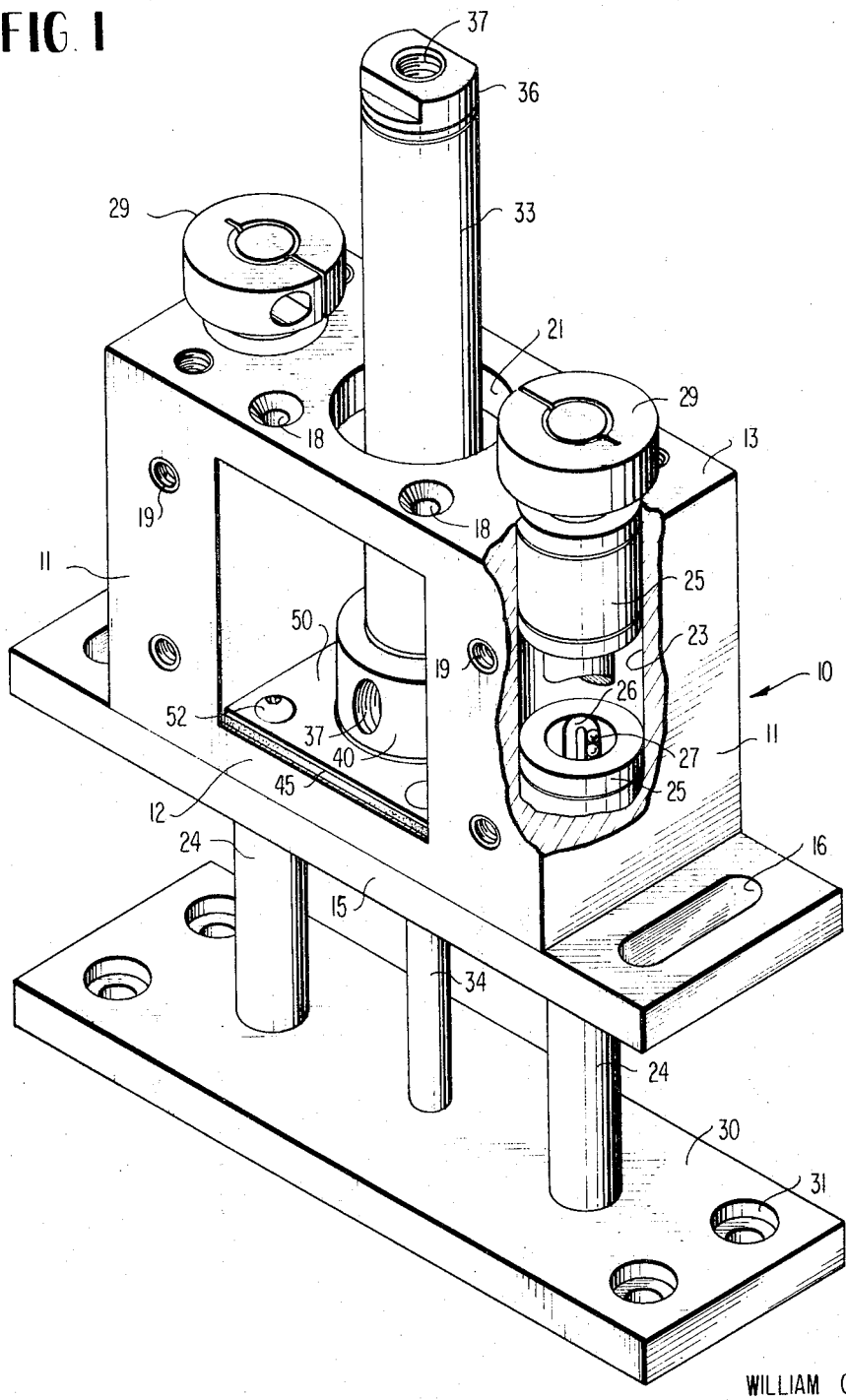
FIG. 1 is a perspective view, partially in section, of a preferred embodiment of the invention.
Figure 2:
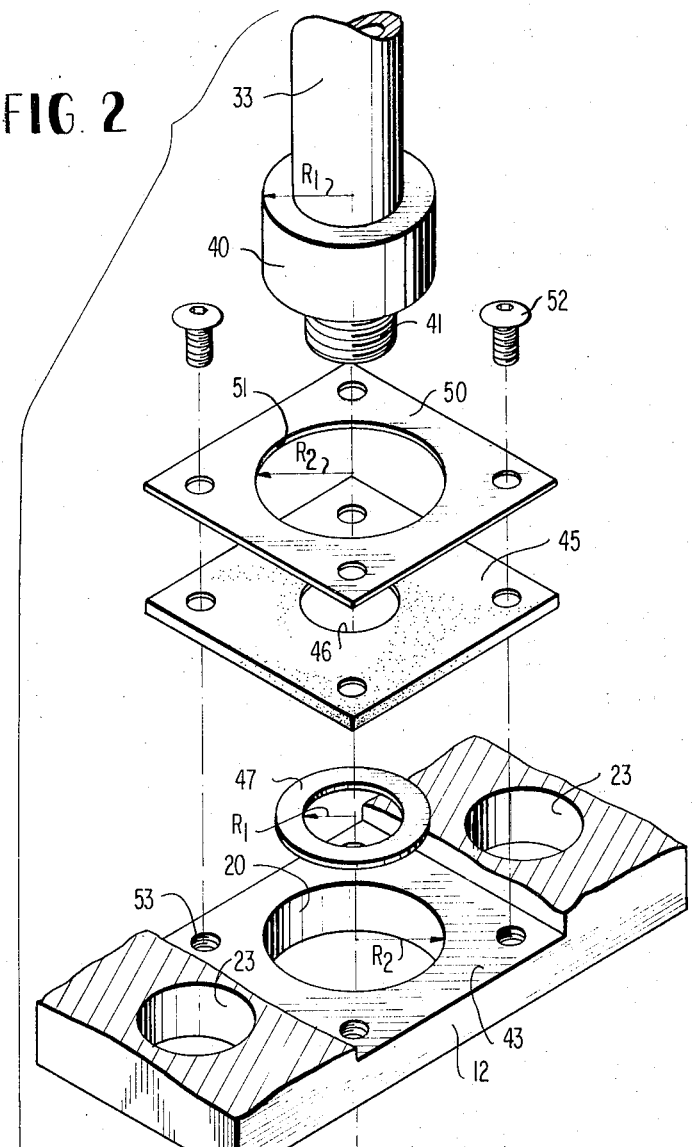
FIG. 2 is an exploded view, partially in section, of the cylinder mounting elements and a portion of the housing.
Figure 3:
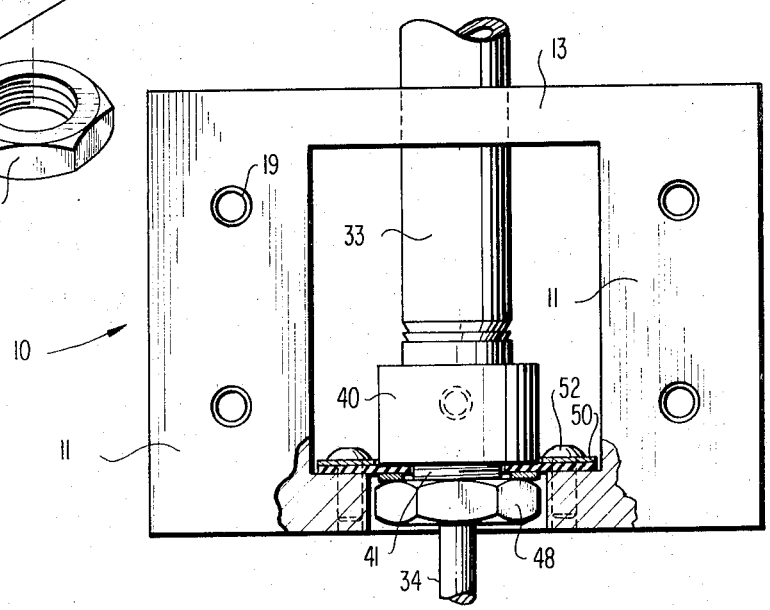
FIG. 3 is an elevational view, partially in section, of the cylinder mounting assembly.

A perspective view showing all the elements of a preferred embodiment of the linear thruster of this invention is shown in FIG. 1. As stated above, the invention is best described with regard to a piston/cylinder expansible chamber motor. The thruster consists of a housing, a thrust plate, a guide mechanism, a power cylinder and piston, and a power cylinder mounting. Housing 10 is normally the fixed element, although it may alternatively be the movable element. Housing 10 may be of virtually any configuration, and that which is shown in FIG. 1 should be considered to be representative only. Housing 10 comprises vertical walls 11, a bottom plate 12 and a top plate 13. These components can be provided by the suitable machining of a solid block, or the housing can be fabricated of individually manufactured elements. Housing 10 can also be provided with an auxiliary mount 15, shown attached to the bottom of the housing, although such a mount may also be attached to vertical walls 11 or top plate 13, or a plurality can be used. Threaded holes 19 are provided for the attachment of mount 15. Attachment of housing 10 to a machine can be made by means of bolts in engagement with slots 16 in mount 15 or in holes 18.

Bottom plate 12 has a cylinder receiving opening 20 and top plate 13 has an aligned cylinder receiving opening 21 through which the power cylinder extends. The diameters of openings 20 and 21 are greater than the diameter of the cylinder by predetermined amounts, to be explained below.

Within each of the vertical walls 11 is a guide bore 23. Bores 23 are parallel and function to provide precise parallelism of the guide rods. Although two bores 23 are illustrated, it should be realized that a greater number of such bores can be provided. Installed in each of the bores 23 is a guide rod 24. The guide rods 24 are parallel to one another and function to precisely guide the linear movement of the thrust plate and to resist lateral and torsional loads. Guide rods 24 are precisely machined elements and are mounted in bores 23 in such a manner as to insure parallelism to one another during the entire linear stroke. While the illustrated guide rods 24 are of circular cross-section, other configurations can be used. Each guide rod 24 can be mounted in its respective bore 23 by means of a plurality of precision spaced bearing inserts 25, precisely positioned and aligned with one another in order to allow accurate sliding movement of the guide rod 24 installed therein. Bearing inserts 25 can be any type of known bearing including sleeve, ball or roller. The bearing inserts 25 shown in FIG. 1 are of the recirculating ball type, having grooves 26 and a plurality of ball bearings 27. While the invention shows bearing inserts 25 in the bores 23, it should be realized that bores 23 themselves can be utilized as journal bearings or can have ball bearings installed directly therein. In any event, the important factor is that guide rods 24 are mounted in such a manner as to insure that they are aligned in parallel relationship during their sliding movement, and that there is negligible play between guide rods 24 and bearings 25.

Means for limiting the sliding movement of guide rods 24 can be provided in the form of movable collars 29 affixed to each guide rod 24 at a particular position. The collars 29 shown in the drawings are at the upper ends of guide rods 24 and thus limit the outward stroke thereof. However, such collars can be placed on the lower portion of guide rods 24 in order to limit the inward stroke. Multiple collars can also be used on each guide rod.

Attached to the lower ends of guide rods 24 is a thrust plate 30. Guide rods 24 are fixedly attached to thrust plate 30 in any known manner such as by screw threads, keys or welding. A plurality of openings 31 are provided in thrust plate 30 for attaching the object to be moved, if desired. While thrust plate 30 is shown as a flat rectangular plate, other configurations are within the scope of this invention. Although not shown, upward protrusions can be installed on thrust plate 30 at such appropriate positions as to engage mounting plate 15, in order to limit the inward movement of the guide rods in the same manner as would the collars 29.

Motivation for the linear thruster can be provided by many known types of power units. Illustrated is an expansible chamber motor comprising a power cylinder 33 and a piston (not shown). A piston rod 34 is slidable through a seal in the end plate of cylinder 33 in the usual manner. Piston rod 34 is rigidly attached to thrust plate 30 at a point intermediate guide rods 24. Power cylinder 33 is advantageously a double acting expansible chamber motor, although other arrangements such as a single acting motor with a spring return can also be used. Cylinder 33 is provided with an end closure 36 having a threaded opening 37 for connection with a hydraulic or pneumatic fluid supply system (not shown) on one side of the piston. At the other end of cylinder 33 is a mounting collar 40 that also contains a threaded opening 37 communicating with the interior of the cylinder for connection with the source of hydraulic or pneumatic fluid on the other side of the piston.

The particular manner in which power cylinder 33 is mounted in housing 10 is one of the key features of this invention. At its lower end, cylinder 33 is provided with a circular mounting collar 40 and a threaded portion 41. Threaded portion 41 has an opening through which piston rod 34 extends. Collar 40 is of radius R1. Bottom plate 12 of housing 10 is provided with a recessed portion including a mounting surface 43. Cylinder 33 is supported in housing 10 by a retainer 45 of rubberized fabric or other like material which has in its center an opening 46 of radius equal to the radius of threaded portion 41. Retainer 45 can be of a rubberized fabric, neoprene rubber, urethane sheeting, vinyl or any type of material which possesses the necessary combination of flexibility and tear and stretch resistance or it can be of these materials having metal parts fabricated therein for added strength. Retainer 45 will be subjected to shearing forces adjacent to opening 46, so the material of which it is manufactured must be selected with this in mind. Threaded portion 41 of cylinder 33 is inserted in opening 46 and retainer 45 is attached to the cylinder by means of a flat washer 47 and a nut 48, which will trap retainer 45 between the upper surface of washer 47 and the underside of collar 40. The radius of the flat washer is usually also R1. Retainer 45 is sandwiched between the mounting surface 43 and a flat metal spring plate 50, which has a central opening 51. Opening 20 in bottom plate 12 and opening 51 in plate 50 are each of radius R2 which is slightly greater than radius R1. The difference between radius R1 and radius R2 is a critical factor, and is calculated with regard to the amount of movement that is to be permitted cylinder 33 and upon the shear force that will be placed upon retainer 45 by the normal operation of the device. The objective is to allow cylinder 33 some limited degree of angular and linear movement without pulling retainer 45 out through openings 20 and 51. Although openings 20 and 51 have been described above as having the same radius R2, these radii can be different, depending upon the requirements of apparatus. Retainer 45 is sandwiched between spring plate 50 and surface 43 and both are fastened to housing 10 by a plurality of screws 52 cooperating with threaded openings 53 in bottom plate 12. Alternatively retainer 45 can be attached to spring plate 50, which in turn is attached to housing 10. It is important to realize that cylinder 33 is attached only to retainer 45, and retainer 45 is attached to housing 10. The degree of movement allowed cylinder 33 is controlled by spring plate 50 and surface 43. On larger cylinders, it may be desirable to capture retainer 45 between a pair of large washers in order to provide a greater gripping area between the cylinder and retainer.

In order to accommodate angular movement of cylinder 33, opening 21 in top plate 13 is of radius larger than the radius of the cylinder at that point. The selection of this dimension can provide an outside limit to the amount of angular movement that can be achieved by cylinder 33 by engaging the top of the cylinder, but otherwise is not critical. The length of the stroke of which the thruster is capable depends upon the length of the guide rods and, of course, the length of the stroke of the power units. In the thruster design described above, it is possible to interchange power cylinders since a longer cylinder will simply extend upwardly through opening 21. The relationship of cylinder diameter to the diameter of openings 20 and 51 remains critical, but by the use of properly selected collars 40 and washers 47, cylinders of greater or lesser diameter can also be interchanged.

The operation of the linear thruster is as follows:

Housing 10 is suitably affixed to the frame of the apparatus with which the linear thruster is to be operated by means of screws, bolts or other known devices, and thrust plate 30 is likewise attached to the object to be moved or positioned. Suitable connections are made to openings 37 in power cylinder 33 so that fluid communication is established with a pressure fluid source and a control system, not shown. In the known manner, pressure fluid is provided to one side or the other of the piston in power cylinder 33, causing linear movement of piston rod 34 and thrust plae 30 outwardly or inwardly with respect to housing 10. Thrust plate 30 is precisely guided during the power stroke by guide rods 24. The length of the stroke is also controlled by means such as collars 29. If a lateral, torsional or tilting force is applied to thrust plate 30, guide rods 24, supported in housing 10 by bearing inserts 25, resist the force. The undesired lateral or torsional load is not normally felt by piston rod 34 and cylinder 33. However, should some slight force be applied to piston rod 34, cylinder 33 would realign itself as necessary to compensate, by virtue of its novel mounting.

Upon application of power to the power cylinder 33, in either direction, the linear force upon cylinder 33 tends to move it and retainer 45 in a direction perpendicular to the surface of retainer 45. The net effect is to put the retainer in a shearing stress condition as the reacting cylinder attempt to pull it through one of the openings 20 or 51. However, since the radius of openings 20 and 51 is only slightly greater than the radius of collar 40 and washer 47, retainer 45 cannot be forced through the opening.

Owing to the fact that retainer 45 is flexible, some degree of angular movement of cylinder 33 about its axis is possible. The degree of such movement in a typical thruster is approximately 3° or less. Thus, if by virtue of a manufacturing discrepancy the cylinder and piston are not perfectly aligned with one another, a condition that in prior art thrusters would cause binding between the piston and the cylinder, cylinder 33 can move angularly during the stroke to compensate for the misalignment. The resilient mounting provided by retainer 45 also protects against damage from shock loads applied to the thrust plate that would otherwise be absorbed by the power cylinder and pressure fluid supply system. This can often be very damaging, especially when a substantially incompressible fluid is being used. The absorption of shock loads by the cylinder mounting is a very attractive feature of the invention.

While one preferred embodiment of the invention has been described above, it should be realized that this description will suggest to those skilled in the art numerous modifications and alternative embodiments within the scope of the inventive concepts expressed herein. For example, while the invention has been described with regard to an expansible chamber motor device, electric motors and gear drive devices and other power units motivating a drive rod can be used with this thruster incorporating the novel arrangement of the components, and particularly the novel mounting of the motor mechanism within housing 10. Therefore, it should be realized that the scope of the invention described herein is established by the appended claims.

I claim:

1. A linear thruster comprising:

a housing, a plurality of spaced parallel guide rods supported by said housing for sliding axial movement with respect to said housing, a thrust plate attached to said guide rods and movable therewith, means for moving said thrust plate comprising a drive rod attached to said thrust plate and a power unit operatively connected to said drive rod for moving said drive rod, mounting means for mounting said power unit on said housing, said mounting means comprising resilient retainer means attached to said power unit and to said housing to attach said power unit to said housing while allowing said power unit to move with respect to said housing, said retainer means having an opening in which a portion of said power unit is received, said retainer means being attached to said power unit at said opening, and a pair of spaced opposed surfaces carried by said housing and engaging opposite sides of a portion of said retainer means to sandwich said portion of said retainer means therebetween to limit the movement of said power unit with respect to said housing.

2. A linear thruster according to claim 1 wherein one of said spaced opposed surfaces is on said housing and the other of said spaced opposed surfaces is on a mounting plate attached to said housing, each of said surfaces having a surface opening aligned with said retainer opening and receiving said power unit, the radii of said surface openings exceeding the radius of said power unit at corresponding points around the peripheries of said surface openings.

3. A linear thruster according to claim 2 wherein said retainer means and said spaced opposed surfaces are substantially perpendicular to the axis of said drive rod.

4. A linear thruster according to claim 3 wherein said thrust plate is substantially parallel to said housing, and said guide rods and said drive rod are substantially perpendicular to said thrust plate.

5. A linear thruster according to claim 1 wherein said thrust plate is substantially parallel to said retainer means.

6. A linear thruster according to claim 1 wherein said guide rods and said drive rod are rigidly attached to said thrust plate.

7. A linear thruster according to claim 1 wherein said guide rods are positioned on opposite sides of said drive rod and are parallel thereto.

8. A linear thruster according to claim 1 wherein said housing comprises a top plate, a bottom plate and a pair of side walls, said mounting means being carried by said bottom plate and said guide rods being mounted in a plurality of bores in said side walls.

9. A linear thruster according to claim 1 further comprising means for limiting the axial movement of said guide rods with respect to said housing.

10. A linear thruster comprising:
a housing having a cylinder receiving opening therethrough and a plurality of parallel bores,
a guide rod slidably mounted in each of said bores for axial movement therein, said guide rods being parallel to each other,
a thrust plate attached to said guide rods and movable therewith,
a power cylinder positioned in said cylinder receiving opening, said power cylinder having a piston with a piston rod connected thereto, said piston rod extending outwardly from said cylinder receiving opening and being attached to said thrust plate,
power cylinder mounting means comprising resilient retainer means secured to said housing and said cylinder to support said cylinder in said cylinder receiving opening,
a spring plate having a spring plate opening aligned with said cylinder receiving opening for receiving accommodating said power cylinder, said spring plate engaging a portion of said retainer means, said spring plate further being attached to said housing and cooperating with said housing to sandwich a portion of said retainer means therebetween, whereby said power cylinder is permitted to move a predetermined amount with respect to said housing.

11. A linear thruster according to claim 10 wherein the radii of said cylinder receiving opening and said spring plate opening are slightly greater than the radius of said power cylinder at corresponding points where said power cylinder passes therethrough.

12. A linear thruster according to claim 11 wherein said retainer means comprises a retainer opening, the radius of said retainer opening being substantially equal to the radius of said power cylinder at the point it passes therethrough, said power cylinder being attached to said retainer at said opening.

13. A linear thruster according to claim 11 wherein said means, said spring plate and said cylinder receiving opening are in planes substantially perpendicular to the axis of said cylinder.

14. A linear thruster according to claim 10 further including adjustable means on said guide rods for engaging said housing to limit the axial movement of said guide rods.

15. A linear thruster according to claim 10 wherein said thrust plate is substantially parallel to said housing, and said guide rods and said piston rod are substantially perpendicular to said thrust plate.

16. A linear thruster according to claim 10 wherein said guide rods and said piston rod are rigidly attached to said thrust plate.

17. A linear thruster according to claim 10 wherein said guide rods are positioned on opposite sides of said piston rod and are parallel thereto.

18. A linear thruster according to claim 10 wherein said housing comprises a bottom plate, a pair of opposed side walls and a top plate, said bores being in said side walls.

19. A linear thruster according to claim 10 wherein each of said bores contains bearing means engaging and supporting said guide rods for parallel axial movement.

20. A linear thruster according to claim 18 wherein said top plate comprises a top plate opening aligned with said cylinder receiving opening for accommodating said cylinder, said top plate opening having a radius greater than the radius of said cylinder at corresponding points.

21. A linear thruster comprising
a housing having a circular cylinder receiving opening therethrough and a bore on each side of said cylinder receiving opening, said bores being substantially parallel to one another, each of said bores containing bearing means,
a guide rod positioned in each of said bores and slidably mounted in said bearing means for axial movement with respect to said housing, said guide rods being substantially parallel to one another,
adjustable stroke limiting means carried by said guide rods and engageable with said housing to limit the axial movement of said guide rods,
a thrust plate rigidly attached to said guide rods and movable therewith, said thrust plate being substantially perpendicular to said guide rods,
a power cylinder positioned in said cylinder receiving opening, said power cylinder having a piston with a piston rod connected thereto, said piston rod extending outwardly from said cylinder receiving opening substantially parallel to said guide rods and being rigidly attached to said thrust plate at a point between said guide rods,
a resilient power cylinder retainer attached to and contacting said housing parallel to said cylinder receiving opening and in juxtaposition thereto, said retainer having a circular retainer opening aligned with said cylinder receiving opening for accommodating said power cylinder, the radius of said retainer opening being substantially equal to the radius of said power cylinder at the point said power cylinder passes therethrough, said power cylinder being attached to said retainer at said retainer opening, and a spring plate attached to said housing in parallel to said retainer and in juxtaposition to and contacting said retainer, said spring plate having a circular spring plate opening in alignment with said retainer opening for accommodating said power cylinder, said spring plate and said housing cooperating to sandwich said retainer therebetween, said cylinder receiving opening and said spring plate opening each having a radius slightly greater than the radius of said power cylinder at the points said power cylinder passes therethrough.

* * * * *